W. M. BOENNING.
VEHICLE SHOCK ABSORBER.
APPLICATION FILED OCT. 19, 1920.

1,386,759.

Patented Aug. 9, 1921.
2 SHEETS—SHEET 1.

Witness:
Robert E. Weber

Inventor:
William M. Boenning
By Young & Young
Attorneys.

W. M. BOENNING.
VEHICLE SHOCK ABSORBER.
APPLICATION FILED OCT. 19, 1920.
1,386,759.
Patented Aug. 9, 1921.
2 SHEETS—SHEET 2.
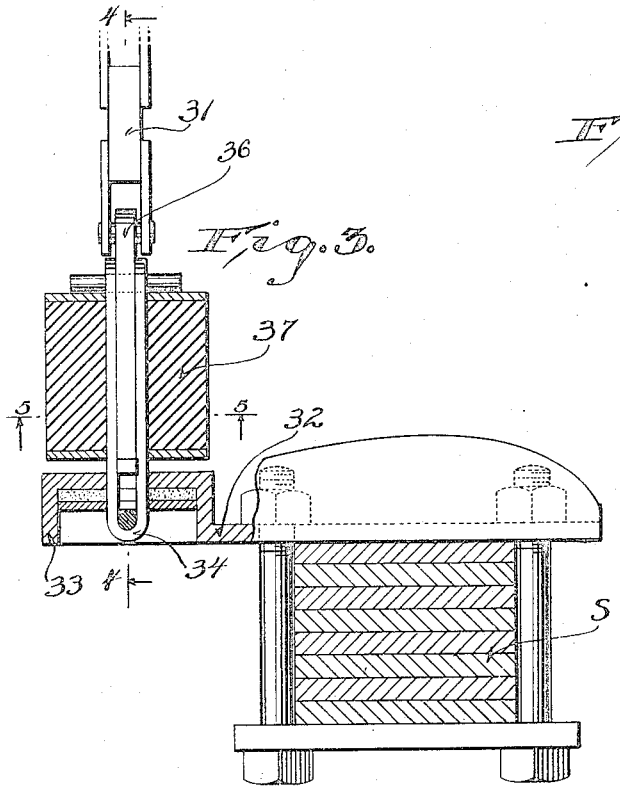
Fig. 3.
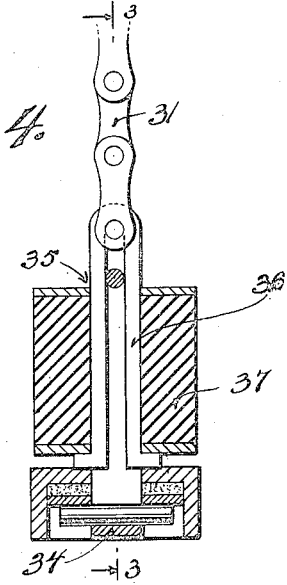
Fig. 4.
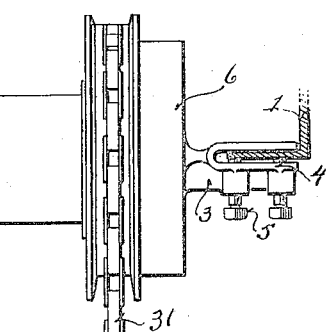
Fig. 6.
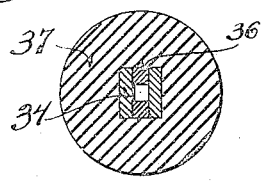
Fig. 5.
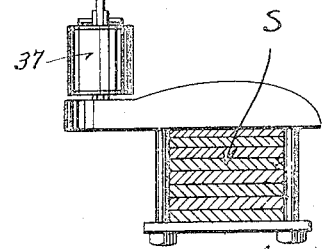
Witness:
Robert E. Weber
Inventor.
William M. Boenning
By Young & Young
Attorneys.

UNITED STATES PATENT OFFICE.

WILLIAM M. BOENNING, OF MANITOWOC, WISCONSIN.

VEHICLE SHOCK-ABSORBER.

1,386,759. Specification of Letters Patent. Patented Aug. 9, 1921.

Application filed October 19, 1920. Serial No. 417,888.

*To all whom it may concern:*

Be it known that I, WILLIAM M. BOENNING, a citizen of the United States, and resident of Manitowoc, in the county of Manitowoc and State of Wisconsin, have invented certain new and useful Improvements in Vehicle Shock-Absorbers; and I do hereby declare that the following is a full, clear, and exact description thereof.

This invention relates to new and useful improvements in shock absorbers, especially those which are adapted to be used in connection with motor vehicles, such as automobiles, motor trucks and the like.

The primary object of the invention is to improve upon the efficiency of devices of this general character, particularly those of that type illustrated in my co-pending patent application, Serial No. 362,221, filed March 1, 1920.

It is a further important object of the invention to provide the working parts of articles of this nature with anti-rattling devices whereby the operation will be practically noiseless. In this connection it is desirable to provide a cushioning means for the attaching end of the restraining chain or like flexible element, as well as a means for cushioning the action of the ratchet pawl forming an important element of the device.

It is also an object of this invention to provide a new and improved construction for the friction elements of the device.

Still another object of the invention is to provide a shock absorber of this general character, the parts of which are largely inclosed to exclude dust and other foreign materials.

With these general objects in view the invention consists in the novel features of construction, combination and arrangement of parts which will be hereinafter more particularly described and claimed.

In the accompanying drawings:

Fig. 3 is a vertical sectional view on the plane of the line 3—3 of Fig. 4.

Fig. 4 is a similar view on the plane of the line 4—4 of Fig. 3, this section being taken at right angles to the plane of the section of Fig. 3.

Fig. 5 is a horizontal section on the plane of the line 5—5 of Fig. 3, and

Fig. 6 is a sectional view through portions of the vehicle frame and its supporting spring showing the manner of associating my improved shock absorber therewith.

Figure 1:
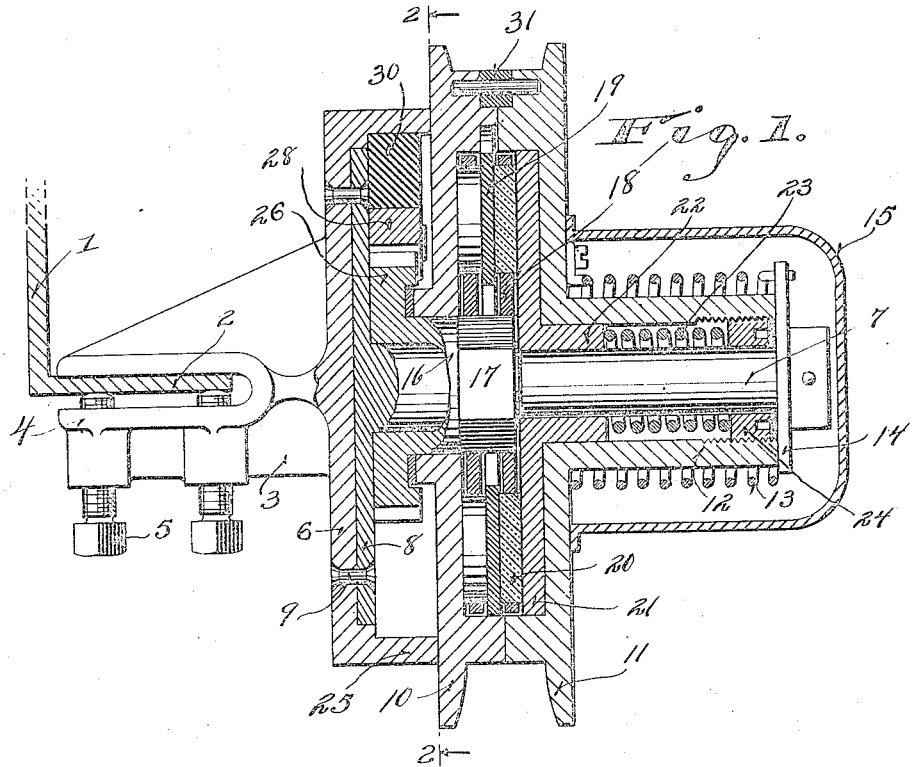
Figure 1 represents a vertical longitudinal sectional view through a shock absorber constructed in accordance with the invention.

Referring more particularly to the drawings, it will be noted that the reference character 1 designates broadly the frame bar of a motor vehicle which has a lateral and horizontal flange 2, to which the bracket portion 3 of my invention is secured. This bracket portion includes a bifurcated member 4 which receives the flange 2, one bifurcation carrying a pair of set-screws 5 for engagement with the latter. Obviously it is within the scope of the present invention of providing any other type of frame bar attaching means.

A supporting plate 6 is formed integrally with the bracket 3 and has a shaft 7 extending horizontally therefrom, this shaft being formed with an attaching flange 8 which is secured to the plate 6 by rivets or the like 9. A friction element receiving chamber is carried by the shaft 7 and consists of an inner section 10 and an outer section 11 which are secured together in any desired manner. The outer section 11 has a sleeve 12 extending therefrom which surrounds the adjacent portion of the shaft 7, and in turn is surrounded by a coil spring 13, one end thereof being secured to the said outer portion 11 of the friction element receiving chamber or casing, while the other end is attached to the shaft 7 by means of an annular flange 14. A sheet metal or the like cap 15 is disposed over this extended end of the shaft 7 and the sleeve 12, and is secured to the portion 11 of the casing to inclose these parts within a dust proof housing.

The portion of the shaft 7 within the chamber above referred to receives a sleeve 16, one end portion of which extends outwardly of the casing and has the latter journaled thereon, whereas the other end portion is polygonal as at 17. The latter portion of the sleeve 16 provides a means for keying a pair of friction element carrying plates 18 thereon, these plates being spaced apart by means of a friction plate 19 and each having a plurality of circular openings for the reception of friction disks 20. In Fig. 1, two of the disks in one plate 18 are shown in section, while two of the disks in the other plate 18 are shown in elevation. In addition to engaging the plate 19, the disks 20 carried by one of the plates 18 engage the inner wall of the portion 10 of the casing, the disks of the other plate 18 bear against said friction plate 19 and a combined pressure distributing and friction plate 21, the same being located in the casing and having a hub 22 surrounding the shaft 7 and disposed in the sleeve 12.

Located within the sleeve 12 and having one end in engagement with said hub 22 is an expansile coil spring 23. The outer end of this spring is in contact with an adjustable nut 24 which, upon being moved inwardly and outwardly of the sleeve 12, adjusts the tension on said spring 23 and varies the friction of the disks 20 and the parts with which they engage.

Figure 2:
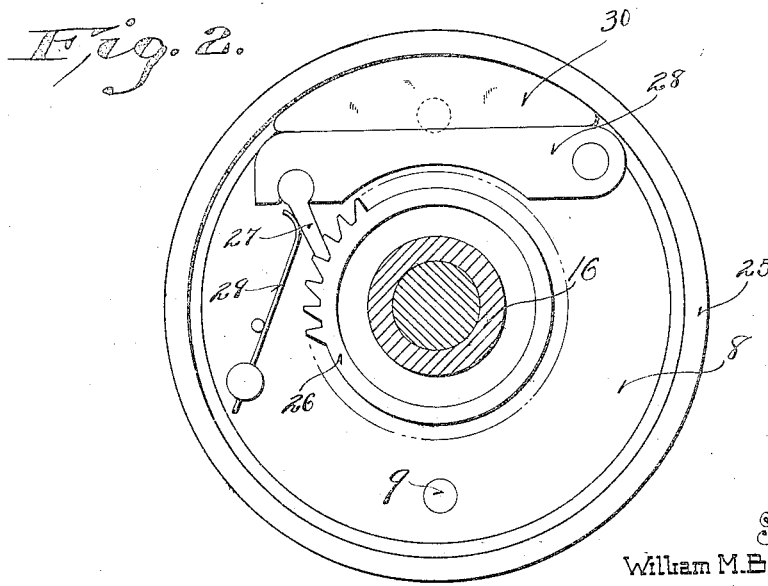
Fig. 2 is a transverse sectional view on the plane of the line 2—2 of Fig. 1.

The hereinbefore mentioned plate 6 has an annular flange 25 which extends toward the friction element receiving casing and is disposed in contact with the inner portion 10 thereof. Thus from Fig. 1 it will be noted that a housing is provided in which is located a toothed ratchet 26 and the means for holding the same against rotation in one direction. This ratchet is formed on the end of the sleeve 16 which extends through said casing. The teeth of the ratchet are engaged by a pawl 27 carried by the lever 28 which is pivoted to the plate 8 and disposed horizontally above said ratchet (see Fig. 2). A leaf or similar spring 29 retains the pawl 27 in engagement with said teeth, while the movement of the lever 28 out of substantially horizontal position is limited by a cushioned block 30. As shown in the last mentioned figure this block 30 is substantially segmental and lies between the lever and the wall 25 of the ratchet housing.

The tension spring 13 is such as to tend to cause the rotation of the casing formed in two parts 10 and 11 in one direction about the shaft 7, but rotation of the same in the reverse direction is occasioned by the movement of the vehicle spring S or axle away from the frame bar 1, said casing being attached to the frame by means of a chain or like flexible element 31. In other words the spring clip 32 has a laterally extending attaching socketed plate 33 through which one part 34 of the two-part extension link 35 is extended, the other part 36 of said link being pivoted to one end of said chain 31.

This extensible link 35 extends through and has its part slidable in a cushioned block 37, one part 36 being engaged with one end of the block and the other part 34 with the other end of the block. Thus as force is exerted on the spring clip 32 tending to move the same away from the end of the chain 31, the cushioned block will be compressed between the end portions of the extension link parts 34 and 36. Such an arrangement provides what is in substance a take-up and prevents any rattling of parts which would normally tend to occur during the operation of the device.

Various minor changes can be made in the form and proportions of the different parts of the device without departing from the principles thereof or sacrificing any of the advantages.

I claim:

1. In a device of the class described, a relatively stationary shaft, a casing journally mounted on the shaft, friction elements disposed in the casing, certain of said elements being fixed thereto, the other elements being rotatable on the shaft when the casing is moved in one direction, a ratchet connected with the last mentioned elements, a pawl for co-action with the ratchet to lock said last mentioned elements to the shaft, and means for cushioning the movement of the pawl to eliminate noise in the operation thereof.

2. In a device of the class described, a relatively stationary shaft, a casing journally mounted on the shaft, friction elements disposed in the casing, certain of said elements being fixed thereto, the other elements being rotatable on the shaft when the casing is moved in one direction, a ratchet connected with the last mentioned elements, a lever pivoted adjacent the ratchet, a cushioned block fixed in position to have said lever bear thereagainst, and a pawl pivoted to the lever for co-action with the ratchet.

3. In a device of the class described, an attaching bracket, a supporting plate formed on the bracket, a stationary shaft, an attaching plate formed on one end of the shaft and secured to said supporting plate, a casing disposed on said shaft and spaced from the supporting plate, a flange extending from the supporting plate to said casing to form a housing, friction elements disposed in the casing, certain of said elements being fixed thereto, the other elements being rotatable on the shaft when the casing is moved in one direction, a ratchet disposed on the shaft and connected with the last mentioned elements, said ratchet being located in said housing, and a pawl disposed in said housing for co-action with said ratchet, whereby to lock said last mentioned elements to the shaft.

In testimony that I claim the foregoing I have hereunto set my hand at Manitowoc, in the county of Manitowoc and State of Wisconsin.

WILLIAM M. BOENNING.